Figure 1:
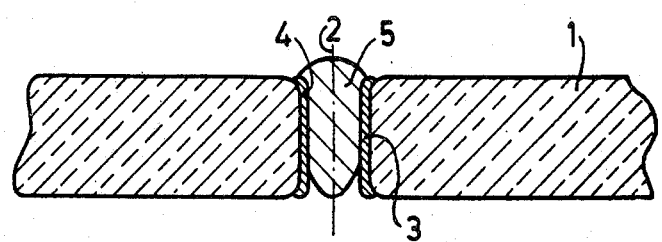

United States Patent [19]
Vrijssen

[11] 3,924,792
[45] Dec. 9, 1975

[54] METHOD OF MANUFACTURING A VACUUM-TIGHT ELECTRIC LEADTHROUGH IN AN ELECTRIC DISCHARGE TUBE

[75] Inventor: Gerardus Arnoldus Herman Maria Vrijssen, Eindhoven, Netherlands

[73] Assignee: U. S. Philips Corporation, N.Y., N.Y.

[22] Filed: Oct. 17, 1974

[21] Appl. No.: 515,702

Related U.S. Application Data

[62] Division of Ser. No. 308,767, Nov. 22, 1972, Pat. No. 3,865,970.

[30] Foreign Application Priority Data

Dec. 7, 1971  Netherlands.................... 7116765

[52] U.S. Cl. ................ 228/118; 228/120; 228/122; 228/132; 228/215; 228/221; 228/DIG. 903
[51] Int. Cl.² ........................................ B23K 31/02
[58] Field of Search ....... 29/472.7, 473.1, 492, 494; 316/19, 24; 174/50.61, 50.53; 313/331

[56] References Cited
UNITED STATES PATENTS

| | | | |
|---|---|---|---|
| 2,709,147 | 5/1955 | Ziegler................................. 29/494 |
| 2,746,140 | 5/1956 | Belser............................ 29/473.1 X |
| 3,147,053 | 9/1964 | Phelps et al. ........................ 316/19 |
| 3,235,943 | 2/1966 | Marafioti...................... 29/472.7 X |
| 3,246,386 | 4/1966 | Ende............................. 29/473.1 X |
| 3,543,383 | 12/1970 | Freeman et al................ 29/427.7 X |
| 3,675,062 | 7/1972 | Flasche...................... 174/50.61 X |
| 3,857,161 | 12/1974 | Hutchins, IV.................. 29/473.1 X |

FOREIGN PATENTS OR APPLICATIONS
210,047  2/1956  Australia.............................. 316/19

OTHER PUBLICATIONS
Belser, Richard B., "A Technique of Soldering to Thin Metal Films," *The Review of Scientific Instruments*, Vol. 25, No. 2, 2/54, pp. 180–183.
Jaffee, R. I., "Indium Alloys Finding Important Commercial Uses," Sept., 1952, *Materials & Methods*, pp. 113–115.

*Primary Examiner*—Ronald J. Shore
*Attorney, Agent, or Firm*—Frank R. Trifari; Leon Nigohosian

[57] ABSTRACT

In manufacturing a vacuum-tight electric leadthrough in an electric discharge tube, a plug of indium or an indium alloy is provided in the leadthrough hole the wall of which is covered with a thin layer of nickel. During degassing which is carried out at a high temperature, the indium or the indium alloy melts, dissolves the thin layer of nickel and then adheres rigidly to the released clean surface.

The method is particularly suitable for use in leadthroughs for wall electrodes, as they occur in cathode-ray tubes and television camera tubes, in particular camera tubes of the vidicon type. It is then possible to obtain in one operation cycle the wall electrodes and the electric leadthroughs necessary for that purpose, as a result of which comparatively complicated systems can be manufactured in a rapid and cheap manner.

9 Claims, 5 Drawing Figures

METHOD OF MANUFACTURING A VACUUM-TIGHT ELECTRIC LEADTHROUGH IN AN ELECTRIC DISCHARGE TUBE

The is a division, of application Ser. No 308,767, filed Nov. 22, 1972, which issued on Feb. 11, 1975 as U.S. Pat. No. 3,865,970.

The invention relates to a method of manufacturing a vacuum-tight electric leadthrough in an electric discharge tube, in which the vacuum-tight seal is obtained by filling the hole provided at the area of the leadthrough by means of a plug of indium-containing material.

The invention furthermore relates to a discharge tube comprising an electric leadthrough obtained according to said method.

In a similar method known from German Pat. Specification 1,917,674, a hole is drilled in the face plate of a television camera tube after which a layer of tin oxide which extends at least partly into the wall hole is provided on the inside of the face plate. A plug of indium or another plastic metal is then pressed into the hole and synthetic resin is poured on the contact on the outside after which a steel mandril is pressed into the indium which mandril has to ensure the electric contact with the tin oxide layer via said plug of indium.

Satisfactory results are obtained with the known method as long as the contact is not exposed to temperatures higher than the melting temperature of indium. For example, it has been found after degassing of the material at high temperature that the contact, after cooling, is no longer vacuum-tight. Apart from this, special precautions are necessary if the object underlying the invention is to be achieved. For example, the requirement of a vacuum-tight seal between the glass wall and indium can be satisfied only if the inner wall of the leadthrough contact has been polished extremely smooth, the oxide skin has been removed from the indium and the surface on which the indium is to adhere is particularly clean. Also as a result of this the whole proocess is rather expensive and less suitable for use in series production.

It is an object of the invention to provide a method which does not exhibit the said drawbacks and which can be carried out in a rapid, cheap and reliable manner.

For that purpose, in the method according to the invention a hole is provided in the glass envelope of an electric discharge tube at the area of an electric leadthrough and the wall of said hole is covered with a thin layer of metal, after which a plug of indium or of an indium alloy is pressed into the hole and the assembly is then degassed in a vacuum space at a high temperature, the indium or the indium alloy melting, the thin metal layer dissolving and readily adhering to the wall of the hole upon cooling.

The method according to the invention has the following advantages over the known method.

An electrically reliable, vacuum-tight leadthrough which can be fired in a vacuum or under a protective gas is obtained in a cheap and rapid manner. Special pretreatments of the material, for example, the smooth polishing of the wall of the hole and the removal of the oxide skin of the indium or the indium alloy are not necessary.

During the degassing of the material at high temperature, the indium-containing material dissolves the thin metal layer and then adheres to the wall of the hole. During the preceding operations the metal layer itself has protected the surface from deposit of contaminations so that a rigid and even adhesion of the indium-containing material to the clean surface is ensured.

Since in the method according to the invention the whole wall of the hole for the leadthrough is to be covered with a metal layer, said metal layer is preferably provided chemically. Of the metals which can be provided chemically, such as nickel, cobalt, copper, gold and silver, or alloys thereof, nickel is preferably used in the method according to the invention since said metal can be treated in an easy manner. The chemical provision of a layer of nickel is known in literature as "electroless nickel-plating."

It is known that indium is a good electrical conductor, is extremely ductile, has a very low vapour pressure and readily adheres to clean glass. For a good adherence to the support it is generally desirable that the filling material for the hole of the leadthrough contains indium. However, it is not necessary that said filling material consists entirely of indium. Alloys of indium, in particular those of indium and one or more of the metals platinum, gold, silver, copper, tin, lead, gallium and nickel are also extremely suitable for this purpose, provided the composition of these alloys be such that a sufficient ductility, a low vapour pressure, a good adherence to the support and a sufficiently high melting temperature remain ensured. Said composition, however, has been found not to be very critical, so that within the imposed requirements a very wide variation in the composition of the indium alloy is permissible. This makes it possible to adapt the composition of the indium alloy for an electric leadthrough according to the invention, to achieve an optimum for the conditions prevailing during operation in an electric discharge tube comprising such a leadthrough. An important guide in the choice of said composition may be that which is known with respect to indium alloys from phase diagrams.

In known manner, for example, by means of contact springs, an electric connection between an electrode and its supply and/or control can be produced via the leadthrough according to the invention.

A favourable construction is obtained in that, after producing the electric leadthrough, electrodes are provided on the inside of the envelope of the tube by means of vapour deposition, sputtering or chemically providing a thin layer of metal, preferably nickel.

When, according to a particular embodiment of the invention, a thin layer of nickel is also provided on the inner wall and/or outer wall of the envelope of the tube around the hole simultaneously with the wall of the hole for the leadthrough, the indium or the indium alloy subsequently provided in the hole flows laterally across the provided nickel layer at the high degassing temperature, haircracks and interruptions in the coating layer being formed around the hole during the coolings. A good electric contact between the nickel layer present on the inside and/or on the outside of the envelope then is no longer certain. Decreasing the temperature does not provide a correct solution since, for an effective degassing of the material, a temperature which is as high as possible is just desirable. The solution to this problem is obtained according to a special embodiment of the invention by providing on the provided nickel layer a second layer which consists of a material which prevents an unrestricted lateral flow of the indium or the indium alloy.

Such a layer can be obtained in a simple manner by superficially oxidizing the nickel layer, for example, by heating in open air. This oxidation should of course be carried out before the filling is provided in the hole for the leadthrough. During the subsequently performed degassing process, gases may be liberated mainly from the glass and the nickel layer provided thereon, which gases again reduce the oxide skin present on the nickel layer, as a result of which the effect in view is fully or partly lost. In order to prevent this, the glass support and the nickel layer provided thereon is preferably degassed, in the method according to the invention, before the said nickel layer is superficially oxidized.

By heating the nickel layer which has a thickness of approximately $0.1\mu$um at 330°C in open air for 30 minutes, an oxide skin is obtained which is sufficiently thick to sufficiently restrict the lateral flow of the indium or the indium alloy at a degassing temperature of 500°C, while the dissolving therein of the nickel layer present on the wall of the hole is by no means disturbed.

This particular embodiment of the method according to the invention can be sufficiently used if, as described in the Dutch Pat. Application 7,101,522, wall electrodes of nickel are provided on the inside of the tube wall. In one operation cycle, an electrode system and the electric leadthrough necessary for that purpose can be manufactured in a simple and cheap manner.

The method according to the invention is preferably used in the manufacture of television camera tubes and cathode ray tubes in which the electrode systems for focusing and/or deflecting the electron beam are provided on the inside of the envelope.

Figure 2:
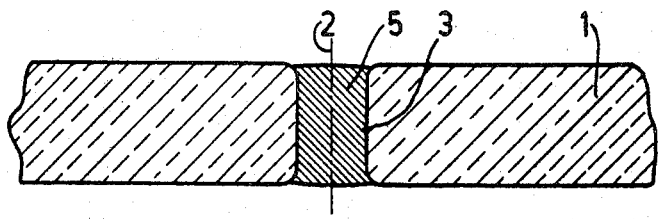
Figure 3:
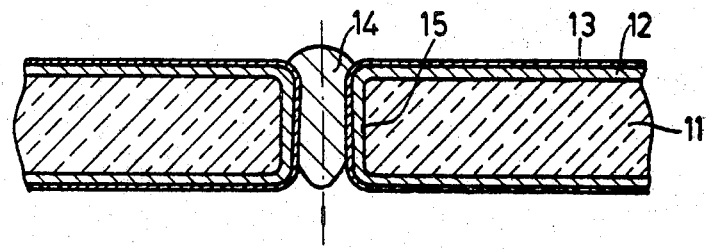
Figure 4:
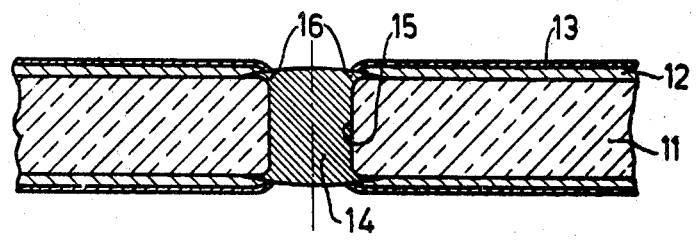

The method according to the invention will be described in greater detail with reference to a drawing, in which;

FIGS. 1 and 2 are cross-sectional views not to scale through the axis of the hole of an electric leadthrough in the last two successive stages of the method according to the invention, FIGS. 3 and 4 are cross-sectional views likewise not drawn to scale of an electric leadthrough in the last two successive stages of the method according to the invention in which a superficial oxidation of the nickel layer has previously taken place.

Figure 5:
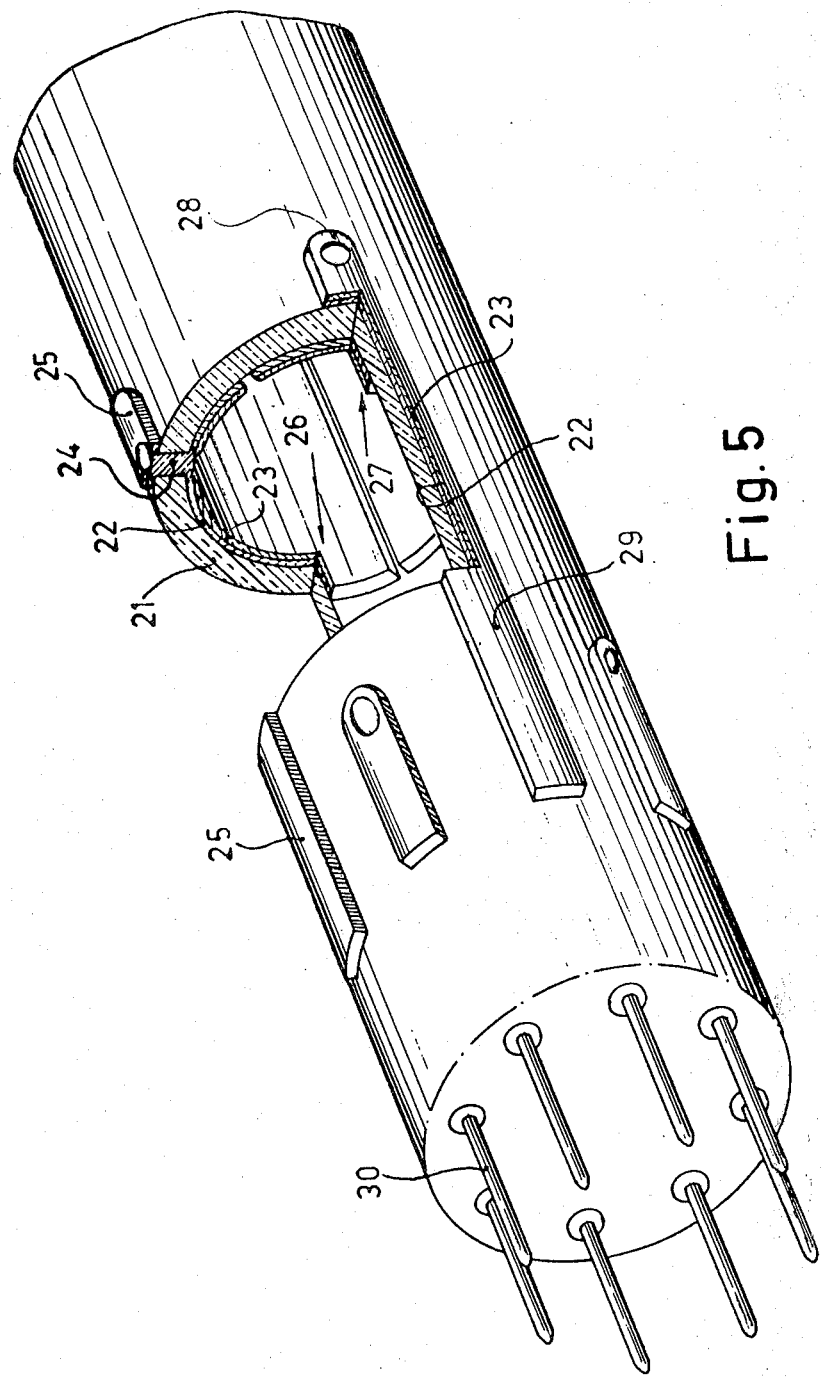

FIG. 5 is a perspective view partly broken away and not drawn to scale of a part of a television camera tube provided with electric leadthroughs obtained according to the method as described with reference to FIGS. 3 and 4.

In FIG. 1 a hole 2 having a diameter of 0.5 mm is provided in the 1 mm thick glass wall 1 of the envelope of the tube by means of sandblasting. The wall 3 of the hole is electroless nickelplated with a nickel layer 4 of $0.1\mu$um thick, after which the hole is filled with an indium plug 5.

FIG. 2 again shows the cross-section of the electric leadthrough of FIG. 1 after the material has been degassed by heating at 500°C in a vacuum space and the indium 5 has dissolved the nickel layer 4 and has adhered to the wall 3 of the hole 2.

In FIG. 3 the glass wall 11 of the envelope of the tube serves as a support of the nickel layer 12 which extends over the inside and outside of the envelope as well as over the wall 15 of the hole for the leadthrough. By heating at 330°C for 30 minutes in open air the nickel oxide layer 13 has formed. After cooling the hole is filled with an indium alloy 14 containing 5% of tin.

FIG. 4 again shows the cross-section of the electric leadthrough of FIG. 3 after the material has been degassed by heating at 500°C in a vacuum space for 60 to 90 minutes and the indium alloy 14 has dissolved the oxide layer 13 and the nickel 12 present in the hole and has adhered to the wall 15 of the hole. The extent to which the indium alloy flows at 16, depends upon the degassing temperature, the degassing time, the thickness of the oxide layer 13 and the thickness of the nickel layer 12.

FIG. 5 shows a part of a television camera tube. The glass wall 21 of the envelope of the tube has a thickness of 1 mm and serves as a support of the "electroless" nickel layer 22 which again has an oxide layer 23. A plyg 24 consisting of an alloy of 95% indium and 5% silver is present in a hole of 0.5 mm cross-section and makes an electric contact between the connection strip 25 present on the outside of the envelope and the electrode 26 provided on the inside. Electrode 27 is connected to strip 29 via leadthrough 28 in an analogous manner. The leadthrough pins 30 serve for the supply and control of the electron gun not shown in the drawing.

What is claimed is:

1. A method of manufacturing a vacuum-tight electric leadthrough in an electric discharge tube comprising a hole in the tube envelope at the area of the leadthrough, comprising the steps of:
    a. covering the wall of the hole with a thin layer of metal,
    b. providing in said hole a plug consisting essentially of one of indium and an indium alloy,
    c. degassing the assembly in a vacuum and at elevated temperature,
    d. dissolving the metal layer in the material of said plug, and, then,
    e. cooling said material, whereby said material rigidly adheres to the wall of the hole.

2. A method as claimed in claim 1, wherein said indium alloy consists essentially of indium and at least one of platinum, gold, silver, copper, tin, lead, gallium and nickel, and said metal consists essentially of at least one of nickel, cobalt copper, gold, silver, and alloys thereof.

3. A method as claimed in claim 1, comprising the further step of then providing on at least one of the inner and outer walls of said envelope a thin layer of metal which contacts said leadthrough.

4. A method as claimed in claim 1, comprising the step of simultaneously with the step of covering said hole wall with said metal layer, providing a further thin layer of metal on at least one of the inner and outer walls of the tube envelope around said hole, and then providing said further layer or layers with a second layer which consists of a material adapted to restrict the flow of the plug material along said further layer.

5. A method as claimed in claim 4, wherein said further layer is provided on the wall of the tube by one of vapor deposition, sputtering, and chemical deposition.

6. A method as claimed in claim 5, wherein said further layer consists essentially of chemical deposited nickel and has a thickness of approximately 0.1 micron.

7. A method as claimed in claim 4, wherein said metal consists essentially of nickel and said step of providing said second layer comprises superficially oxidizing said nickel layer.

8. A method as claimed in claim 7, wherein prior to said step of superficially oxidizing said nickel layer, said tube envelope containing said nickel layer is degassed.

9. A method as claimed in claim 8, wherein said tube is degassed in a vacuum space at a temperature of about 500°C and said nickel layer present on the wall of the leadthrough hole dissolves in said plug material.

* * * * *